United States Patent
Agombar et al.

(10) Patent No.: US 8,195,620 B2
(45) Date of Patent: Jun. 5, 2012

(54) STORAGE SYSTEM WITH IMPROVED MULTIPLE COPY TARGETING

(75) Inventors: John P. Agombar, Winchester (GB); Christopher B. E. Beeken, Chandlers Ford (GB); Carlos F. Fuente, Bishops Waltham (GB); William J. Scales, Portchester (GB)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 12/249,667

(22) Filed: Oct. 10, 2008

(65) Prior Publication Data

US 2009/0106332 A1  Apr. 23, 2009

(30) Foreign Application Priority Data

Oct. 19, 2007  (EP) .................................... 07118900

(51) Int. Cl.
*G06F 17/30* (2006.01)

(52) U.S. Cl. ........ 707/674; 707/601; 707/600; 709/217; 711/162; 711/114; 711/154

(58) Field of Classification Search .................. 707/600, 707/674; 709/217; 711/114, 162, 154, 6.12
See application file for complete search history.

(56) References Cited

U.S. PATENT DOCUMENTS

| | | | |
|---|---|---|---|
| 6,618,794 B1 * | 9/2003 | Sicola et al. ................... | 711/154 |
| 7,024,530 B2 * | 4/2006 | Jarvis et al. ................... | 711/162 |
| 7,055,009 B2 * | 5/2006 | Factor et al. ................... | 711/162 |
| 7,133,989 B2 * | 11/2006 | Burton et al. ................... | 711/162 |
| 7,398,354 B2 * | 7/2008 | Wightwick et al. ........... | 711/114 |
| 7,650,476 B2 * | 1/2010 | Ashour et al. ................. | 711/162 |
| 7,734,885 B2 * | 6/2010 | Shackelford .................. | 711/162 |
| 7,739,352 B2 * | 6/2010 | Wong et al. ................... | 709/217 |
| 7,809,691 B1 * | 10/2010 | Karmarkar et al. ........... | 707/674 |
| 7,823,007 B2 * | 10/2010 | Boyd et al. .................... | 714/6.12 |
| 7,930,477 B2 * | 4/2011 | Wightwick et al. ........... | 711/114 |
| 2009/0031097 A1 * | 1/2009 | Nelson .......................... | 711/162 |
| 2009/0193064 A1 * | 7/2009 | Chen et al. .................... | 707/204 |

* cited by examiner

*Primary Examiner* — Frantz Coby
(74) *Attorney, Agent, or Firm* — Lieberman & Brandsdorfer, LLC

(57) ABSTRACT

A storage control apparatus cooperable with a plurality of controlled storage apparatus arranged in a cascade of point-in-time copy relationship. The apparatus includes: a rate control component operable to set a desired rate for making clean a first target one of the plurality of controlled storage apparatus; a comparator component responsive to a signal from the rate control component to request and receive metadata from the plurality of controlled storage apparatus and to identify discrepant metadata; and a copy initiator, responsive to the comparator component to identify discrepant metadata and to initiate a copy operation from a first target one of the plurality of controlled storage apparatus to a second target one of the controlled storage apparatus.

12 Claims, 6 Drawing Sheets

STORAGE SYSTEM WITH IMPROVED MULTIPLE COPY TARGETING

BACKGROUND OF THE INVENTION

1. Field of the Invention

The present invention relates to the field of computer storage systems, and particularly to advanced function storage systems providing a FlashCopy® function or the equivalent. (FlashCopy is a Registered Trade Mark of International Business Machines Corporation.)

2. Background of the Invention

In the field of computer storage systems, there is increasing demand for what have come to be described as "advanced functions". Such functions go beyond the simple I/O functions of conventional storage controller systems. Advanced functions are well known in the art and depend on the control of metadata used to retain state data about the real or "user" data stored in the system. The manipulations available using advanced functions enable various actions to be applied quickly to virtual images of data, while leaving the real data available for use by user applications. One such well-known advanced function is FlashCopy®.

At the highest level, FlashCopy® is a function where a second image of 'some data' is made available. This function is sometimes known in other system contexts as Point-In-Time copy, or $T_0$-copy. The second image's contents are initially identical to that of the first. The second image is made available 'instantly'. In practical terms this means that the second image is made available in much less time than would be required to create a true, separate, physical copy, and that this means that it can be established without unacceptable disruption to a using application's operation.

Once established, the second copy can be used for a number of purposes including performing backups, system trials, and data mining. The first copy continues to be used for its original purpose by the original using application. Contrast this with backup without FlashCopy®, where the application must be shut down, and the backup taken, before the application can be restarted again. It is becoming increasingly difficult to find time windows where an application is sufficiently idle to be shut down. The cost of taking a backup is increasing. There is thus significant and increasing business value in the ability of FlashCopy® to allow backups to be taken without stopping the business.

FlashCopy® implementations achieve the illusion of the existence of a second image by redirecting read I/O addressed to the second image (henceforth Target) to the original image (henceforth Source), unless that region (also known as a "grain") has been subject to a write. Where a region has been the subject of a write (to either Source or Target), then to maintain the illusion that both Source and Target own their own copy of the data, a process is invoked which suspends the operation of the write command, and without it having taken effect, issues a read of the affected region from the Source, applies the read data to the Target with a write, then (and only if all steps were successful) releases the suspended write. Subsequent writes to the same region do not need to be suspended since the Target will already have its own copy of the data. This copy-on-write technique is well known and is used in many environments.

All implementations of FlashCopy® rely on a data structure which governs the decisions discussed above, namely, the decision as to whether reads received at the Target are issued to the Source or the Target, and the decision as to whether a write must be suspended to allow the copy-on-write to take place. The data structure essentially tracks the regions or grains of data that have been copied from source to target, as distinct from those that have not. In its simplest form, this data structure is maintained in the form of a bitmap showing which grains have been written to, and which are untouched by write activity.

Some storage controllers allow a user to configure more than one target for a given source, also known as multiple target FlashCopy®. This has a number of applications. For instance, different experiments could be run against each of the targets. Or the targets might be taken at different times (e.g. different days in the week), and allow historical access to the disk, perhaps for the purpose of recovering from some data corruption, such as might be caused by a virus.

There are two categories of implementation for multiple target FlashCopy®, including:

In conventional implementations, a write to the source disk for an area that has not yet been copied will result in the data being copied to all of the target disks by reading the data from the source and then writing the data to each of the targets. In these implementations it will always be the case that a read I/O request submitted to a target disk can be satisfied by FlashCopy® reading data either from the source disk or the target disk depending on whether the data has previously been copied. It is never the case that to satisfy a read request from one target disk it is necessary to read data from another target disk. Such an arrangement is shown in FIG. 1, where A is a source LOGICAL UNIT, and B and C show two targets that were taken at some time in the past. A, B and C can each be updated. The arrows show grains (fixed sized regions of the disk) which are still dependent on the source LOGICAL UNIT. These have corresponding bits of '0b' in the bitmap which tracks the progress of each FlashCopy®. In cascade implementations, such as the multiple target FlashCopy® facility available with the IBM SAN Volume Controller (SVC), a write to the source disk for an area that has not yet been copied will result in the data being copied to just one of the target disks. For these implementations, a read I/O request submitted to a target disk may require FlashCopy® to read data from the source disk, the target disk or another target disk in the cascade depending on which source or target disks have previously been written to. Such an arrangement is shown in FIGS. 2A and 2B, where A and B are already in a FlashCopy® relationship, and C is added as a copy of A. At the point that the image C is established, the relationships can be arranged as shown in FIG. 2A. In effect, B is established as a copy of C (which is at this instant identical to A), and C is a copy of A. The bitmap held by B that described its differences from A also correctly describes its difference from C. C is identical to A, and has an empty bitmap. Updates to A now only require a copy operation to copy data from A to C. Conversely, updates to C require two copy operations, from A to C, and from C to B. This is because updates to the middle of a chain force a copy to the relationships on either side. For instance, taking the arrangement of FIG. 2A, if we apply updates to the first and fourth grains in A, and the second and 6th grains in C, the outcome is as depicted in FIG. 2B.

The key advantage of a cascaded implementation over a conventional implementation is that it reduces the overheads of FlashCopy® when processing write I/O requests by minimizing the number of disks that data has to be copied to. In particular the overheads of a cascaded implementation do not increase as the number of targets increases and consequently unlike traditional implementations it is possible to support a much greater number of targets.

The primary disadvantage of a cascaded implementation over a conventional implementation is that it generates additional dependencies between the target disks to be able to satisfy read requests. From one target disk a cascaded implementation may have to read data from another target disk in the cascade. Consequently, if a user wishes to stop or re-trigger a FlashCopy® mapping that is part of a cascade then it is first necessary to copy all the data that is required by other target disks in the cascade to another target disk. In contrast, a conventional solution does not have this problem. It is possible to stop or re-trigger a FlashCopy® mapping without ever having to first copy data from the target disk to another disk.

One example of a situation in which a FlashCopy® mapping may need to be stopped or re-triggered is one in which the members of the cascade are used for different levels of backup. A first-level backup, such as a daily backup, may need to be stopped or re-triggered without affecting a second level of backup, such as a weekly backup.

To allow a FlashCopy® mapping to be stopped or re-triggered, a cascaded implementation can introduce the concept of a map being in a "removing" state while the data that is required by other targets is being copied. Within SVC this process of copying this data is called cleaning. While it is in this "removing" state, the target disk of the map being removed cannot be accessed. This is in order to guarantee that the cleaning operation completes. Only when the target is clean can a map be stopped or re-triggered.

It would thus be desirable to have a multiple-target system in which the scalability of the cascade version could be combined with the flexibility of the conventional version.

SUMMARY OF THE INVENTION

The invention comprises a method, system, and article for operating a storage control apparatus in communication with a plurality of controlled storage apparatus arranged in a cascade point-in-time copy relationship.

In one aspect of the invention, a storage control apparatus is provided in cooperation with a plurality of controlled storage apparatus arranged in a cascade of point-in-time copy relationships. A rate control component is provided and is operable to set a desired rate for making clean a first target of one of the plurality of controlled storage apparatus. Responsive to a signal from said rate control component, a comparator component requests and receives metadata from the plurality of controlled storage apparatus, and identifies discrepant metadata. A copy initiator is provided in communication with the comparator component to identify discrepant metadata and to initiate a copy operation from a first target one of the controlled storage apparatus to a second target one of the controlled storage apparatus.

In another aspect of the invention, a method is provided for operating a storage control apparatus, cooperable with a plurality of controlled storage apparatus arranged in a cascade of point-in-time copy relationships. A desired rate is set by a rate control component, for making clean a first target one of the plurality of controlled storage apparatus. In response to a signal from the rate control component, a comparator component requests and receives metadata from the controlled storage apparatus and identifies discrepant metadata. Responsive to identifying discrepant metadata, a copy operation is initiated from a first target one of the plurality of controlled storage apparatus to a second target one of the controlled storage apparatus.

In yet another aspect of the invention, an article is provided with a computer-readable carrier including computer program instructions to operate a storage control apparatus having a plurality of controlled storage apparatus arranged in a cascade point-in-time copy relationship.

Instructions are provided to set a desired rate, by a rate control component, to make clean a first target of one of the plurality of controlled storage apparatus. In response to a signal received from the rate control component, instructions are provided to request and receive, by a comparator component, metadata from the plurality of controlled storage apparatus and to identify discrepant metadata. Instructions are also provided to initiate a copy operation from a first target of one of the plurality of controlled storage apparatus to a second target one of the controlled storage apparatus in response to identification of discrepant metadata.

Other features and advantages of this invention will become apparent from the following detailed description of the presently preferred embodiment(s) of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not all embodiments of the invention unless otherwise explicitly indicated. Implications to the contrary are otherwise not to be made.

DETAILED DESCRIPTION OF THE PREFERRED EMBODIMENT

Figure 1:
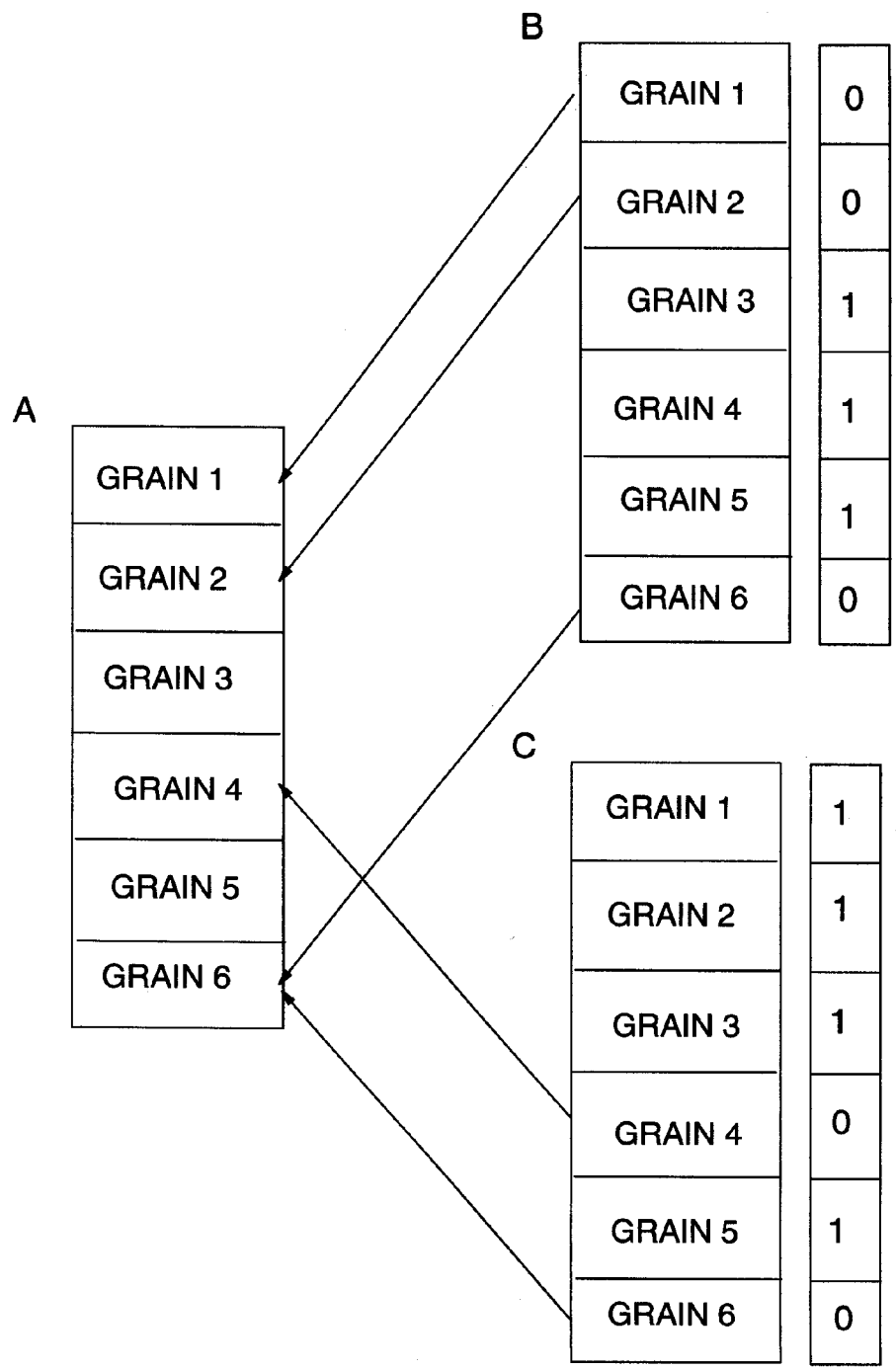
FIG. 1 shows a prior art data arrangement having multiple parallel targets.
Figure 2A:
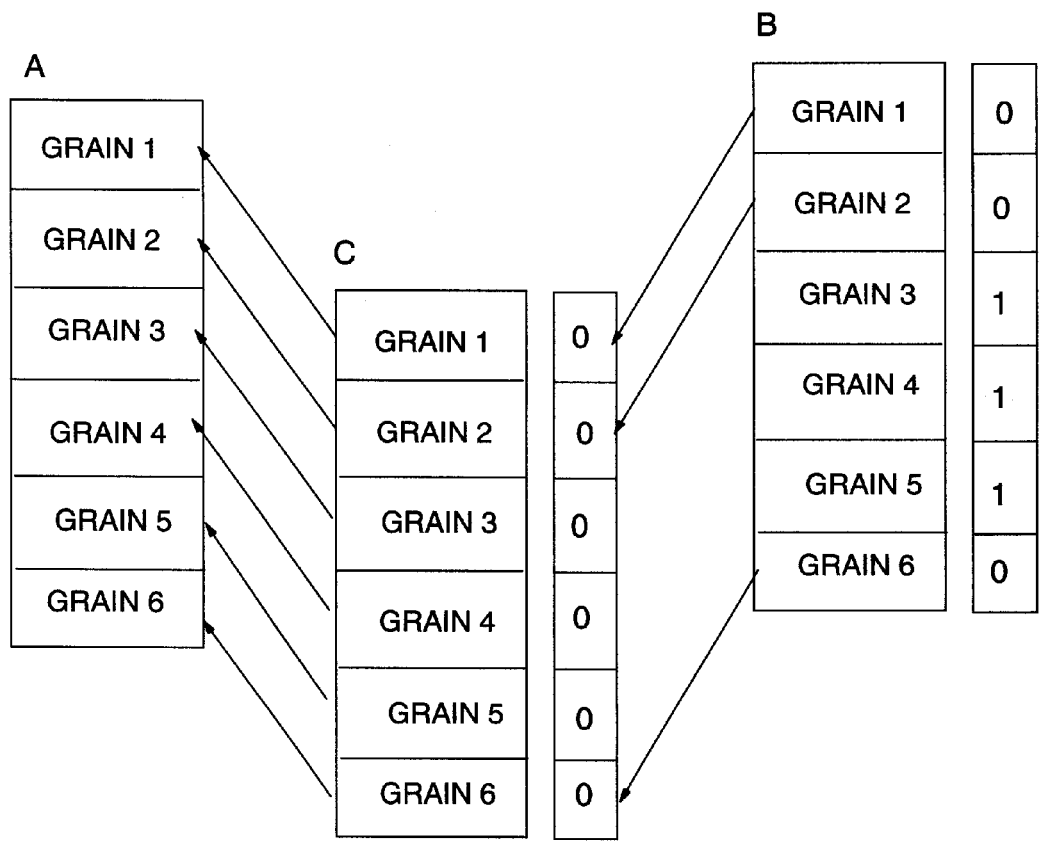
FIG. 2A shows an initial data arrangement having cascaded targets.
Figure 2B:
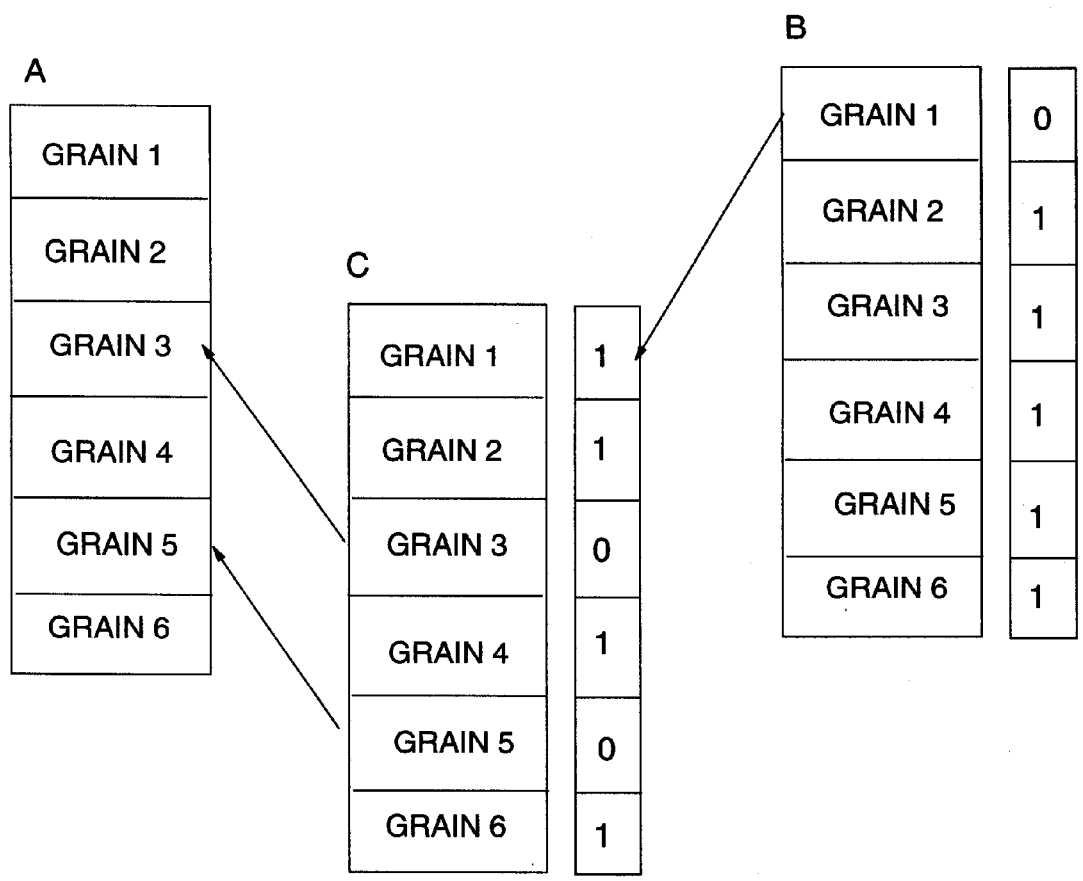
FIG. 2B shows an updated data arrangement having cascaded targets.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of rate control component, comparator component, copy initiator, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the spirit and scope of the present invention.

The following definitions are provided to enhance the understanding of the invention:

A grain is a sequence of contiguous logical block addressings (LBAs). In one embodiment, the size of the grain is not important.

A disk consists of grains, upstream, and downstream, where:
 grains are a sequence of regions which holds data for the disk,
 upstream is the upstream map of grains, and
 downstream is the downstream map of grains.

A host system is a system that reads and writes to source or target disk.

A map consists of origSource, source, target, split, and cleanRate, where:
 origSource is the source disk specified by the user when the map was created.
 source is the next upstream disk in the cascade,
 target is the target disk specified by the user when the map was created, and
 split is a bitmap, with a bit for each grain of the target, indicating the position of the data presented to the host system. When data has been copied to the target disk for a particular grain, that grain is said to have been split and a bit is set in the split bitmap.
 cleanRate is a user set value indicating the desired number of grains to clean in a unit of time.

In this description it will be assumed that all read/writes from the host system are the size of a grain. However, in one embodiment, the present invention is extended to address circumstances where all read/writes from the host system are not the size of a grain. For example, if a host system writes part of a grain then it may be necessary to read the old contents of the grain into a buffer, merge the new data being written by the host into this buffer, and then write a whole grain using the contents of the buffer.

Consider the situation with two FlashCopy® maps A and B, where A maps $Disk_0$ to $Disk_1$ and B maps $Disk_0$ to $Disk_2$. If map B is started first followed by map A then we have the situation described below:
Disks:
$Disk_0$=($grains_0$, null,A),
$Disk_1$=($grains_1$,A,B),
$Disk_2$=($grains_2$,B,null)
and the maps are described by
A=($Disk_0$,$Disk_0$,$Disk_1$,$bitmap_A$,$cleanRate_A$),
B=($Disk_0$,$Disk_1$,$Disk_2$,$bitmap_B$,$cleanRate_B$), A grain n, on a target disk $Disk_1$, is said to be dirty if bit n in bitmap $bitmap_A$ is set and bit n in $bitmap_B$ is not set. Cleaning a dirty grain for a given map is the process of copying the dirty grain to the next downstream target disk.

Figure 3:
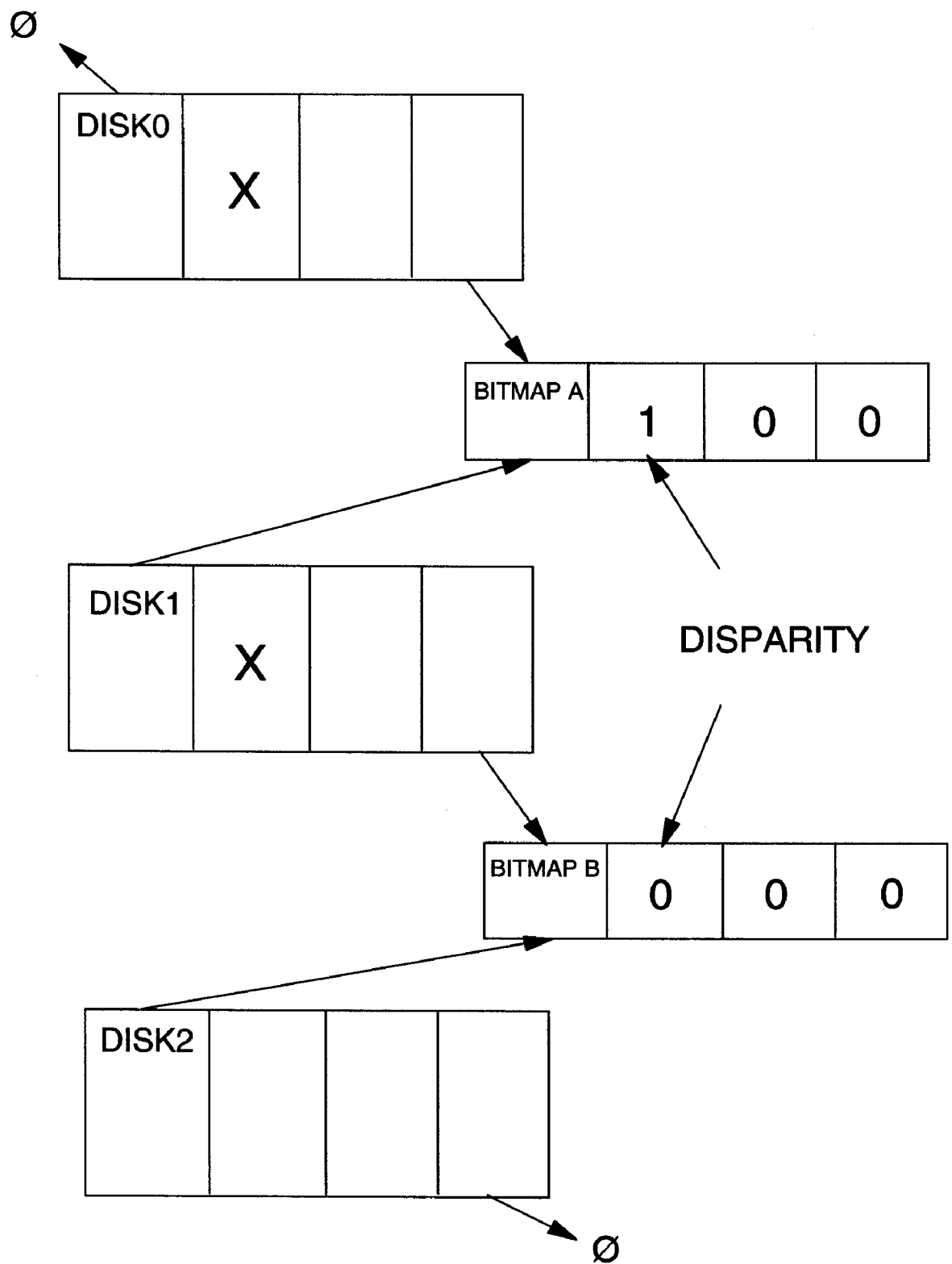
FIG. 3 shows a data arrangement having cascaded targets in which a disparity between bits in the bitmap shows a need for a cleaning operation according to the preferred embodiment of the present invention, and is suggested for printing on the first page of the issued patent.

This situation is illustrated more clearly with reference to FIG. 3, in which $DISK_0$ is the start of the cascade, its upward pointer is null, and which maps to downstream $DISK_1$ by means of $BITMAP_A$. $DISK_1$ has its upward pointer pointing to $BITMAP_A$, and it in turn maps to downstream $DISK_2$ by means of $BITMAP_B$. $DISK_2$ is the end of the cascade, as indicated by its downward pointer shown as null. A grain in $DISK_0$ contains data X, and that grain has been copied in the conventional FlashCopy® manner to $DISK_1$, causing the corresponding bit in $BITMAP_A$ to be set. $DISK_2$ is thus dependent on $DISK_1$ for data X, as is indicated by the 0 in the corresponding bit position in $BITMAP_B$ and the lack of data in the corresponding data position on $DISK_2$. In other words, the grain containing X is dirty. If $DISK_2$ were to be called on to return that data, it would thus first need to retrieve the data from $DISK_1$. To remove that dependency, a cleaning component is required to act in response to the discrepancy between $BITMAP_A$ and $BITMAP_B$ to copy the data downward from $DISK_1$ to $DISK_2$.

With the system defined as above a map can be put into a cleaning mode by setting a non-zero cleaning rate. Once in this mode the map will clean grains. The process of cleaning a disk consists of searching the bitmaps of the upstream and downstream map to locate dirty grains, which are indicated by a discrepancy as shown in FIG. 3. When a dirty grain is located, it is read from the disk and written to the next downstream target disk. The bitmap for the downstream map is then updated to indicate that the grain has been split and hence the grain is no longer dirty.

So for example, if $DISK_1$ is being cleaned and bit n is set in $BITMAP_A$ and bit n is not set in $BITMAP_B$, then the cleaning process will identify that grain n is dirty and will copy this grain from $DISK_1$ to $DISK_2$ and then set bit n in $BITMAP_B$, which will make the grain clean.

The cleaning process is repeated until there are no dirty grains. While the cleaning process is in operation, I/O requests may continue to be processed and these may result in grains being made dirty on the disk being cleaned which will create additional work for the cleaning process.

The cleaning rate allows the user to control the impact this cleaning would have on the system. This means that the user can keep a map clean for most of the time by setting a high cleanRate or they can reduce cleanRate to reduce the performance impact of the cleaning process on the system. In one embodiment, the cleanRate may be reduced to zero. If the cleaning rate is set higher than the rate at which I/O is creating new dirty grains, then the number of dirty grains will reduce over time. Thus, if the map is required to be re-triggered at a certain time the cleanRate can be manipulated by the user during a "run-up" period to ensure that the removing time during which a target is inaccessible is minimized. The cleaning process can be contrasted with the conventional background copy process that involves copying data to the target disk of a FlashCopy® map. The background copy process is used to make a target disk independent in terms of the data it requires to service reads. Clearly the background copy process could be used to make a target disk clean by ensuring that other target disks in the cascade are independent. However, the background copy process requires copying more data than is necessary to ensure that a target is clean, and therefore is disadvantageous in terms of performance.

An important advantage of the preferred embodiments of the present invention is that it allows the user to minimize the time that the target disk is inaccessible while still providing the performance benefits of the cascaded algorithm.

Figure 4:
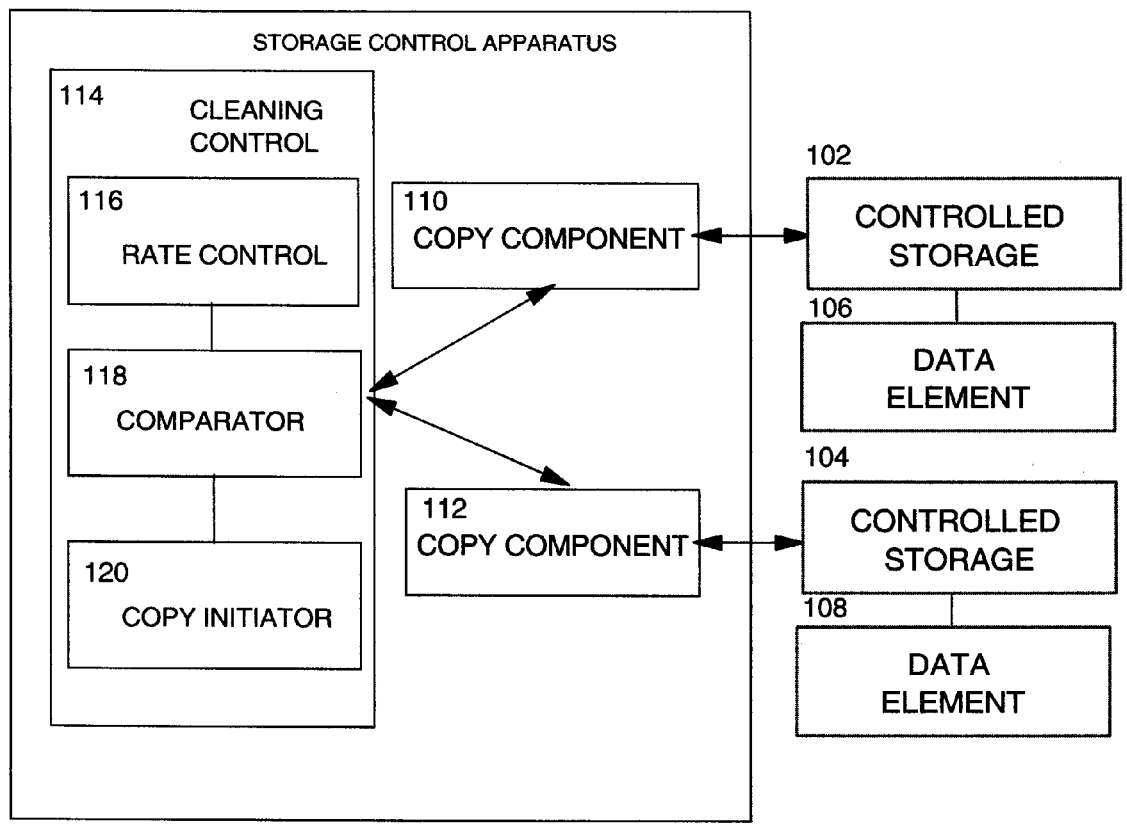
FIG. 4 is a schematic diagram illustrating a storage controller structure according to one embodiment of the present invention.

FIG. 4 shows an arrangement of apparatus according to a preferred embodiment, including a storage control apparatus (100), cooperable with a plurality of controlled storage apparatus (102), (104), which represent targets in a FlashCopy® cascade. Exemplary data elements (106), (108) are under the control, respectively, of controlled storage apparatus (102) and (104). Storage control apparatus (100) includes copy components (110) and (112) operable in communication with controlled storage (102) and (104), respectively. The storage control apparatus (100) also includes a cleaning control component (114) which is operable in communication with copy components (110) and (112), and comprises rate control component (116), comparator (118), and copy initiator (120). The rate control component (116) is operable to receive a user input to set a rate at which a cleaning operation is to be performed. The comparator (118) is operable to receive data from copy components (110) and (112) relating to the copied or uncopied status of grains in data elements (106) and (108) under the control of controlled storage (102) and (104), respectively. The comparator (118) is also responsive to a comparison indicating a discrepancy in the status, and to pass a status indicator and data to copy initiator (120). The copy initiator (120) is responsive to receipt of the status indicator and data, and further responsive to receipt of a rate from rate control component (116) to cause copy components (110) and (112) to cooperate in performing a copy operation to clean a target in the FlashCopy® cascade.

Figure 5:
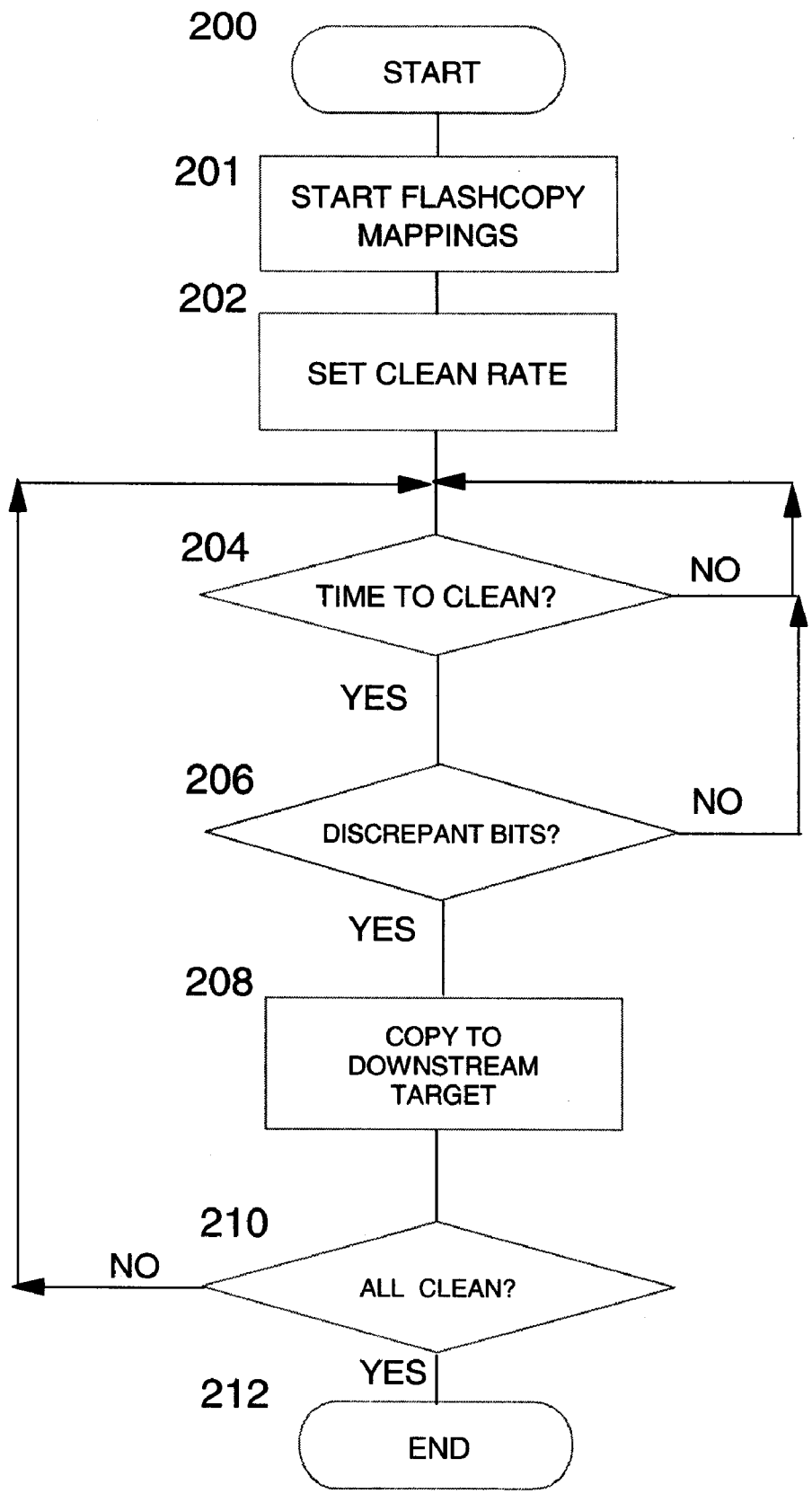
FIG. 5 shows the steps of a method according to the preferred embodiment of the present invention.

Turning now to FIG. 5, there is shown a sequence of steps of a method according to which a preferred embodiment of the present invention may be implemented in a logic arrangement of hardware, software or a combination thereof. The sequence begins at START step (200), and at step (201), the FlashCopy® mappings for the cascade are started, followed by setting the clean rate for each mapping (202). Processing begins normally until the clean rate for a mapping indicates by a positive outcome at test step (204) that it is time to perform any necessary cleaning for a target. At test step (206), it is determined whether or not there are any discrepant bits in the relevant bitmaps, indicating that cleaning is required. If no discrepant bits are found, processing continues until test step (204) is repeated. Conversely, if discrepant bits are found at test step (206), the copy to the downstream target is performed at step (208). At test step (210), the target bitmap is checked for an all clean condition, and if it is clean, the process ends at END step (212). If the outcome at test step (210) is negative, further copying may be required and the rate of cleaning may need to be tested again, and so the process returns and repeats steps (204) to (208).

It will be readily appreciated by one of ordinary skill in the art that various further modifications to the embodiment described above will be apparent to a person of ordinary skill in the art.

It will be clear to one skilled in the art that the method of the present invention may suitably be embodied in a logic apparatus comprising logic means to perform the steps of the method, and that such logic means may comprise hardware components or firmware components.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

It will be further appreciated that embodiments of the present invention may be provided in the form of a service deployed on behalf of a customer to offer offsite disaster recovery services.

It will also be appreciated that various further modifications to the preferred embodiment described above will be apparent to a person of ordinary skill in the art.

Advantages Over the Prior Art

The components herein, and the associated functionality of the components, enables a user to minimize the time it takes to remove a FlashCopy® mapping form a cascade. This is achieved by enabling the user to clean the target of a map while the target disk is still accessible. The cleaning process is a background process that copies data form the target to a downstream disk in the cascade. A rate setting controls the speed at which data is copied form the target. In this way, the user can balance the flexibility of the cascade in terms of time taken to put a disk in order to be removed against the scalability of the cascade.

Alternative Embodiments

It will be appreciated that, although specific embodiments of the invention have been described herein for purposes of illustration, various modifications may be made without departing from the spirit and scope of the invention. In particular, the plurality of controlled storage apparatus includes a storage area network, which in itself includes a storage virtualization engine. With respect to the rate control component, it may be operable to receive a user input to set the desired rate for making the clean the first target. Accordingly, the scope of protection of this invention is limited only by the following claims and their equivalents.

The invention claimed is:

1. A storage control apparatus, cooperable with a plurality of controlled storage apparatus arranged in a cascade of point-in-time copy relationships, and comprising:
   a rate control component operable to set a desired rate to clean a first target of one of said plurality of controlled storage apparatus;
   a comparator component responsive to a signal from said rate control component to request and receive metadata from said plurality of controlled storage apparatus and to identify discrepant metadata; and
   a copy initiator, responsive to said comparator component identifying discrepant metadata, to initiate a copy operation from a first target of one of said plurality of controlled storage apparatus to a second target of one of said controlled storage apparatus.

2. The storage control apparatus of claim 1, wherein said plurality of controlled storage apparatus comprises a storage area network.

3. The storage control apparatus of claim 2, wherein said a storage area network comprises a storage virtualization engine.

4. The storage control apparatus of claim 1, wherein said rate control component is further operable to receive a user input to set the desired rate to make clean the first target.

5. A method of operating a storage control apparatus, cooperable with a plurality of controlled storage apparatus arranged in a cascade of point-in-time copy relationship, comprising:
   setting a desired rate, by a rate control component, for making clean a first target of one of said plurality of controlled storage apparatus;
   responsive to a signal from said rate control component, requesting and receiving, by a comparator component, metadata from said plurality of controlled storage apparatus and identifying discrepant metadata; and
   responsive to identifying discrepant metadata, initiating, a copy operation from a first target of one of said plurality of controlled storage apparatus to a second target one of said controlled storage apparatus.

6. The method of claim 5, wherein said plurality of controlled storage apparatus comprises a storage area network.

7. The method of claim 6, wherein said a storage area network comprises a storage virtualization engine.

8. The method of claim 5, further comprising receiving, by said rate control component, a user input to set the desired rate for cleaning the first target.

9. An article comprising:
   a computer program readable carrier including computer program instructions to operate a storage control apparatus having a plurality of controlled storage apparatus arranged in a cascade point-in-time copy relationship, the instructions comprising:
      instructions to set a desired rate, by a rate control component, to make clean a first target of one of said plurality of controlled storage apparatus;
      instructions responsive to a signal from said rate control component, to request and receive, by a comparator component, metadata from said plurality of controlled storage apparatus and identify discrepant metadata; and
      instructions responsive to identifying discrepant metadata, to initiate a copy operation from a first target of one of said plurality of controlled storage apparatus to a second target one of said controlled storage apparatus.

10. The computer program product of claim 9, wherein said plurality of controlled storage apparatus comprises a storage area network.

11. The computer program product of claim 10, wherein said a storage area network comprises a storage virtualization engine.

12. The computer program product of claim 9, further comprising instructions to receive, by said rate control component, a user input to set the desired rate for cleaning the first target.

* * * * *